United States Patent [19]
Perry

[11] 3,804,344
[45] Apr. 16, 1974

[54] APPARATUS FOR PREPARING DUPLICATING MATERIALS

[75] Inventor: Eric Perry, Arcadia, Calif.

[73] Assignee: Nobilium Products, Inc., Los Angeles, Calif.

[22] Filed: Feb. 5, 1973

[21] Appl. No.: 329,684

[52] U.S. Cl. .......... 241/65, 222/146 R, 241/DIG. 28
[51] Int. Cl. ............................................. B67d 5/62
[58] Field of Search .......... 241/DIG. 28, 23, 65, 84, 241/82.5, DIG. 13; 222/146 R, 146 HF, 146 H

[56] References Cited
UNITED STATES PATENTS
2,235,324  3/1941  Moreland .................... 241/DIG. 28
3,377,466  4/1968  Paulsen ....................... 222/146 R X
3,585,361  6/1971  Rosen et al. ............... 222/146 HE X

*Primary Examiner*—Roy Lake
*Assistant Examiner*—E. F. Desmond
*Attorney, Agent, or Firm*—Spensley, Horn & Lubitz

[57] ABSTRACT

An apparatus for preparing duplicating materials, such as reusable gels used in the manufacture of dental restorations, is disclosed. After being ground, the material is melted in a meltor and then placed in a holding tank. The temperatures in the meltor and holding tank are separately controlled to permit the apparatus to provide a continuous source of usable duplicating material.

12 Claims, 6 Drawing Figures

APPARATUS FOR PREPARING DUPLICATING MATERIALS

BACKGROUND OF THE INVENTION

1. Field of the Invention

The invention relates to apparatuses, such as heaters, used for preparing reusable duplicating materials.

2. Prior Art

In the dental industry, duplicating materials are commonly used to form molds for the manufacture of dental restorations. These duplicating materials are often reusable and, to be reused, must first be melted and then brought to a temperature at which the material may be poured and used.

In the prior art, the devices for performing this melting function comprise a large pot in which the duplicating material is placed. The temperature of the pot is then raised to the point where the duplicating material melts, typically in excess of 200° F. While this temperature is sufficient to melt the material, it is too high for the material to be used as a duplicating material. Thus, such prior art devices often include means for cooling the material in the pot, once the material has been melted. These cooling means include, in some cases, water jackets disposed about the pot for cooling the material in the pot once it has been melted.

One major problem with these prior art devices is that it requires as much as 12 hours from the time that the duplicating material is placed into the pot before the material may be drawn from the pot in a usable form. This time is required to first melt the material and then, secondly, to cool the material to an appropriate temperature. Another problem with these prior art devices is that duplicating material in a solid form may not be added to the pot once the duplicating material in the pot has been cooled to a usable temperature. Thus, these prior art devices cannot provide a continuous supply of usable duplicating material, but rather must be recycled each time the solid duplicating material is added to the pot.

As will be seen, the presently invented apparatus solves these prior art problems and reduces the time required for the gel to be converted to a usable state from approximately 12 hours to about 1 hour. Also, the presently invented device allows solid material to be added to the apparatus while usable material is being removed from the apparatus. Therefore, the apparatus is capable of providing a continuous source of ready duplicating material and does not require recycling each time solid duplicating material is added to the apparatus.

SUMMARY OF THE INVENTION

An apparatus for preparting duplicating materials, particularly those utilized in the dnetal industry for the manufacture of dental restorations is disclosed. The apparatus includes a grinder for grinding the solid or gel like material. The ground material drops into a meltor, the temperature of which is sufficiently high to melt the duplicating material. The generally cylindrically shaped meltor includes a plurality of apertures disposed about the generally conical bottom of the meltor. As the duplicating material melts, it flows through these apertures into a standby or holding tank. The temperature of the material in the holding tank is controlled by use of a blower and a heater in order to first reduce the temperature of the melted material to a usable level and then to maintain the material at a usable temperature. A stirrer is disposed within the holding tank in order to assure that the melted duplicating material remains consistent. When the duplicating material is drawn from the holding tank it is at a proper temperature and ready for use.

DETAILED DESCRIPTION OF THE INVENTION

An apparatus for preparing duplicating materials, such as those commonly utilized for forming molds in the preparation of dental restorations, is described. The duplicating material, which hereinafter shall be referred to as gel, is a solid or jelly like substance when it is solidified and may be any one of numerous duplicating materials, such as hydro-colloidal substances. One such duplicating material which is particularly suitable for use with the presently disclosed apparatus, is sold commercially under the trademark "Nobiloid." These duplicating materials are reusable and after a particular mold has been used, the duplicating material is melted and reused to form subsequent molds.

Figure 1:
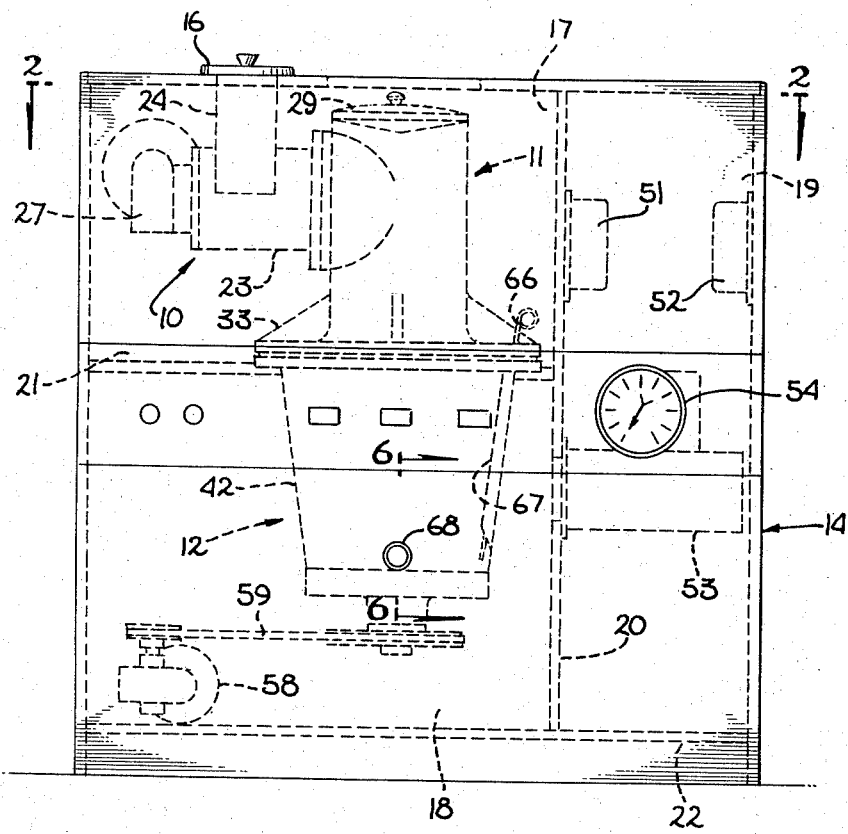
FIG. 1 is a plan front view of the disclosed apparatus and illustrates in phantom lines the major components of the apparatus.

Referring first to FIG. 1, the major components of the apparatus comprise a grinder 10, a meltor 11, a holding tank 12 an a blower 53. The apparatus is disposed within a houidng 14 which includes a base plate 22, an internal vertical wall shown as plate 20 and a horizontal internal wall illustrated as plate 21. The plate 21 and plate 20 partly define a first compartment 17 which houses meltor 11 and a second compartment 18 which houses the holding pot 12. A third component 19, which is defined by the vertical plate 20 at one end, and the exterior of housing 14 at the other end, houses thermostats 51 and 52 and the blower 53. As will be appreciated, the shape and size of the housing is not critical, and in the presently preferred embodiment, th entire housing is fabricated from ordinary sheet metal.

Figure 2:
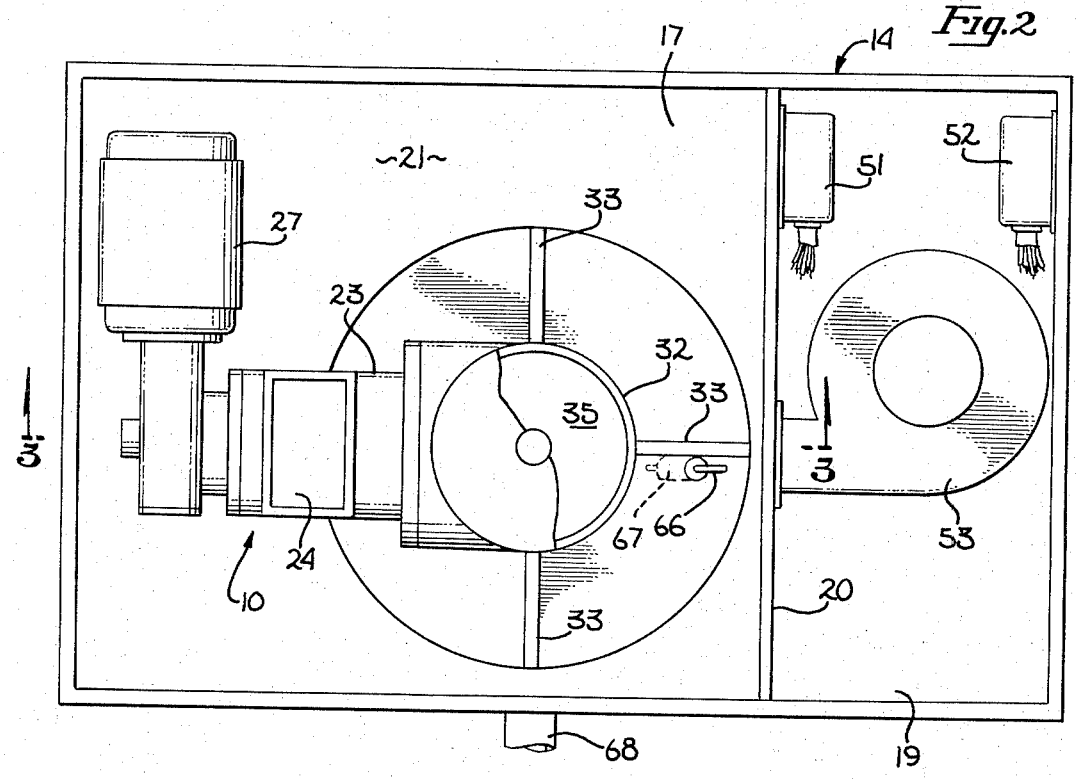
FIG. 2 is a cross-sectional view of the device of FIG. 1 taken through section lines 2—2 of FIG. 1.
Figure 3:
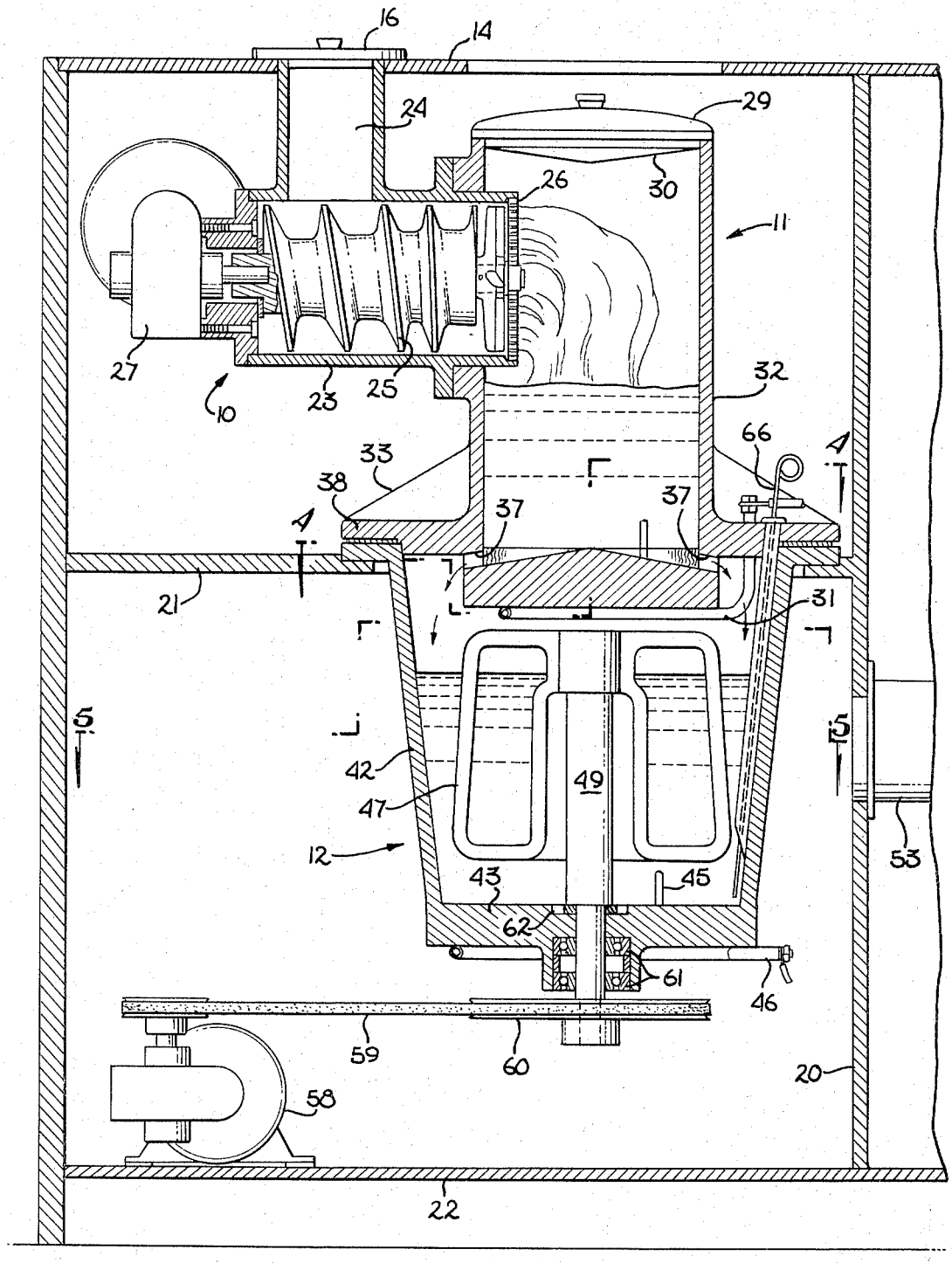
FIG. 3 is a partial cross-section view of the apparatus taken through section line 3—3 of FIG. 2.

Referring to the figures, and in particular FIGS. 1, 2 and 3, the grinder 10 includes a grinder case 23 which defines a horizontal, cylindrical bore for receiving the screw 25 and a vertical cylindrical hopper 24. The generally elongated cylindrical screw 25 rotates about its axis and is mounted at one end to the circular grate 26, and at the other end to motor and gear box 27. In the presently preferred embodiment, the minor diameter of the screw 25 gradually increases for that section of the screw disposed closest to grate 26, while the pitch of the screw decreases in the direction of the grate 26. The motor and gear box 27 may be an ordinary electrical motor and gear box for driving the screw 25, in the presently preferred embodiment, at approximately 60 RPM. A lid 16 is disposed at the end of hopper 26 opposite screw 25 coincident with the upper surface of the housing 14. The grinder is supported within the housing from the housing and also from the meltor 11. As is readily apparent from the figures, and particularly FIG. 3, the solid gel may be placed into hopper 24 and pressed onto the rotating screw 25 such that the gel is grounded as it is forced by the screw 25 through the grate 26. The grate 26 communicates with the interior of the meltor 11.

Figure 4:
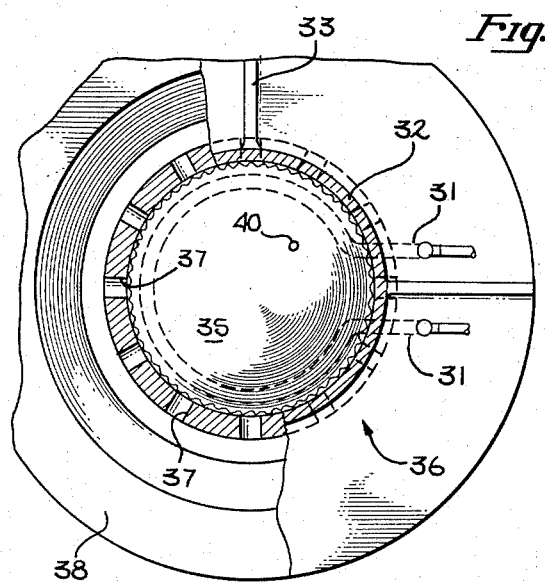
FIG. 4 is an enlarged cross-sectional view used to illustrate the base or bottom of the meltor taken through section line 4—4 of FIG. 3.

The meltor 11 comprises a generally cylindrically shaped casting 32 which includes a plurality of webs 33 disposed at its lower end and used to support the body of the casting 32. The lower end of the meltor 11 terminates in an annular shaped bottom 38 which is fastened to the holding tank 12 and to the hroizontal plate 21. Referring to FIGS. 2, 3 and 4, the lower portion of the meltor 11 includes a bottom portion 36 which defines a general conical surface 35 disposed at the lower end of the casting 32. A plurality of generally radially disposed apertures 37 are cirucmferentially disposed about the bottom portion 36 of the meltor 11 such that fluid or melted duplicating material within the meltor 11 may flow from the interior of the meltor into the holding tank 12. The apertures 37 follow the general contour of the conical melting surface 35 such that melted material under the force of gravity flows freely from the interior of the meltor 11.

In the presently preferred embodiment a heating element 31 is cast into the bottom portion 36 of the meltor 11 and is used for heating the surface 35. A temperature probe 40, which is coupled to thermostat 51, controls current through the heating element 31 such that the temperature in the meltor is maintained at approximately 205° - 225° F. Note that the electrical interconnections between the thermostat 51, the probe 40 and the heater 31, have not been shown in order not to over-complicate the drawings. Commercially available thermostats, heater elements and probes may be utilized within the meltor 11. In the presently preferred embodiment the meltor 11 comprises a vast metal part, although other commonly known fabrication techniques may be utilized to manufacture the meltor 11.

A lid 29 engages the upper portion of meltor 11. The lid 29 includes a lower tapered surface 30, this surface assures that condensation which forms on the lower surface of the lid during the melting of the duplicating material, quickly drops back into the interior of the meltor 11.

The holding tank 12, which is disposed beneath meltor 11, comprises a generally circular tapered tank formed by casting 42, and includes a lower surface 43. Coupled to the lowwer portion of the tank 12 is a heating element 46 which, in the presently preferred embodiment, is placed in contact with casting 42. The entire holding tank is mounted to the plate 21 and supported from this plate. A concentrically disposed bore is disposed through the lower end of the tank 12 for receiving a shaft 49. At the lower end of the shaft 49 is coupled to a pulley 60 and the shaft rotates on bearings 61 mounted within the casting 42. A seal 62 is disposed about the shaft 49 at surface 43 to assure that melted duplicating material does not leak from the tank about shaft 49. The upper end of the shaft 49 is coupled to a pair of generally rectangular shaped blades 47. These blades are used to stir the liquid duplicating material stored within the holding tank 12.

Figure 5:
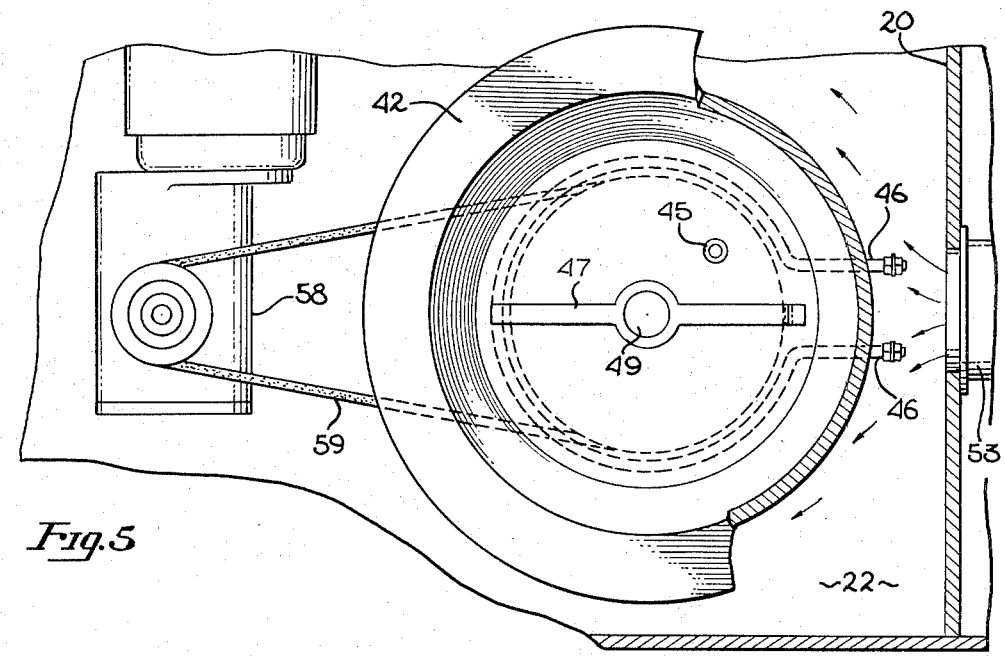
FIG. 5 is a cross-sectional view of the apparatus taken through section line 5—5 of FIG. 3. This view primarily illustrates the holding tank.

Referring particularly to FIGS. 3 and 5, a motor and gear box 58 is mounted to the base 22, and is coupled to pulley 60 via belt 59. In the presently preferred embodiment the stirrer rotates at approximately 30 RPM. Also in the presently preferred embodiment, the belt 59 is relatively loosely mounted upon pulley 60, such that it will slip in the event that the duplicating material within tank 12 becomes solidified. A slip clutch or similar means may be utilized for this purpose in lieu of the belt 59.

A temperature sensing probe 45, which may be similar to probe 40, is disposed within the lower end of the holding tank 12. This probe, in conjunction with thermostat 52 and the heating element 46, assures that the melted duplicating material in the tank 12 is maintained at a predetermined temperature. In the presently preferred embodiment, this temperature is approximately 130° F. This is the temperature at which the duplicating material may be utilized for its intended purpose. As in the case of the heating element for the meltor 11, the interconnections between the probe 45, the heating element 46, and the thermostat 52, have not been shown. The probe 45 is also coupled to the temperature gauge 53 shown in FIG. 1. This gauge displays the temperature of the material contained within the holding tank 12.

Referring primarily to FIGS. 2, 3 and 5, an electrically operated blower 53 is mounted within compartment 19 at plate 20. An aperture is disposed through plate 20, allowing air from the blower to be circulated about the exterior of the holding tank 12. When the duplicating material is first melted within meltor 11, it is too hot to be utilized for its intended purpose. The blower 53 is utilized to cool the duplicating material held within the tank 12 and to reduce the material's temperature to a level where the material may be utilized for its intended purpose.

In the presently preferred embodiment, a timer, not illustrated, is used to control heating element 31 and the blower 53. After duplicating material has been ground and drops into the meltor 11, the timer is actuated. The timer allows the heating element 31 to raise the temperature within the meltor 11 to a predetermined temperature. Simultaneously, the timer actuates the blower 53 such that air flows about and cools the holding tank 12. In the presently preferred embodiment, the timer automatically turns off the heating element 31 and the blower 53 after one hour, since tests have shown that within this time, all the duplicating material within the meltor 11 will have been melted and the temperature of the material lowered to a usable temperature within the holding tank 12. A timer having a variable time, which may be manually set, may also be utilized in this application. During the time that the duplicating material is being melted, heating element 46 automatically maintains the temperature within the tank 12 at the predetermined temperature at which the duplicating material may be poured and used, if heating is required. Each time duplicating material is added to the meltor 11, the timer is again reactuated, thereby activating heating element 31 and blower 53.

Figure 6:
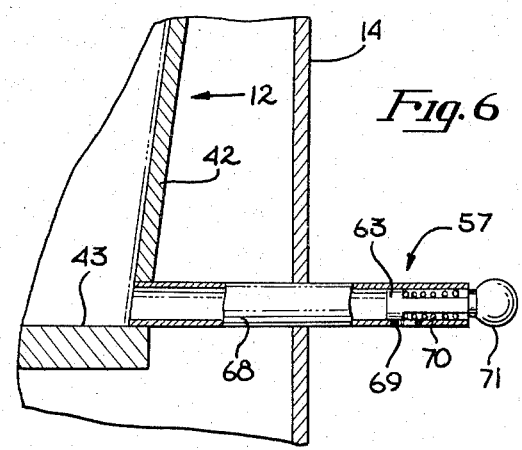
FIG. 6 is a partial cross-sectional view used to illustrate the pouring means coupled to the holding tank. This view is taken through section line 6—6 of FIG. 1.

In FIG. 6, a slide valve 57 is illustrated. This valve communicates with the interior of the holding tank 12 via line 68. A slide disposed within the valve 57 includes a knob 71 at one end and a cylindrical member 63 at the other end. A spring 70 urges the valve in its closed position and when the knob 71 is pulled, the line 68 communicates with a port 69 such that the melted duplicating material within the holding tank 12 may be poured from the tank.

A dipstick is illustrated in FIG. 3 as dipstick 66. This dipstick extends from the lower portion of meltor 11 into the holding tank 12, and is held within the holding tank within tube 67. Tube 67, which is rigidily coupled to the side of the interior wall of the tank, includes a plurality of apertures disposed along its length such that the liquid in the tank communicates with the dipstick. By removing the dipstick from the holding tank, the level of the duplicating material in the holding tank may be readily determined. Other known level detection means may be used to sense the level of liquid in the tank in lieu of the dipstick.

In one embodiment of the present invention the thermostat 51, which is utilized to control the heating element 36, is not utilized, but rather the heating element is of an appropriate capacity to maintain the meltor 11 at the correct temperature. In this embodiment a rheostat for permitting fine adjustments of this heater element is utilized.

It has been found to be advisable to place screens or similar porous members within th apertures 37 and within the line 63, in order to prevent contaminants from proceeding through the apparatus and out the slide valve 57.

In order to utilize the apparatus, the gel, in a solid state, is placed within the hopper 24 of grinder 10. The gel, after being ground, falls into the meltor 11 and accumulates upon the surface 36, as is illustrated in FIG. 3. Where the gel has been previously ground, or comprises small pieces, it may be directly placed into meltor 11 by removing the lid 29. In the presently preferred embodiment, the usable capacity of the meltor 11 is approximately 1 gallon. It has been found that for the more commonly utilized gels, that approximately 1 cup of water should be added to the meltor 11 before the melting process begins. This water is quickly absorbed by the gel within the meltor 11. Once the gel has been ground, the timer previously mentioned is actuated, thereby turnng on blower 53 and the heating element 36. Heating element 46 and the drive means for the stirrer, motor and gear box 58, are actuated by a main power on switch. The heat from element 36 melts the duplicating material within meltor 11 and the duplicating material then falls downward into the holding tank 12, as is graphically illustrated in FIG. 3. The duplicating material, as it flows from the meltor 11, is too hot to be used when it leaves the apertures 37, but once within the holding tank 12, this material is quickly cooled by blower 53 to a temperature of approximately 130° F. in the presently preferred embodiment. The duplicating material in a liquid state in the holding tank 12 is continually circulated by the stirrer which assures that the gel will remain consistent. The temperature gauge 53 indicates that the temperature of the gel in the holding tank is at the correct predetermined temperature and the duplicating material may be poured from the valve 57.

It should be noted that after the solid gel in the meltor 11 has completely melted and thee heating element 36 and blower 53 have been deactivated, the heating element 46 and the stirrer remain in operation as long as liquid remains within the holding tank 12. At any time, provided sufficient remaining volume exists within the holding tank 12, additional solid gel may be placed into the melting tank 11 and the melting cycle repeated, that is, by reactivating the blower 53 and the heating element 36. Thus, liquid may be drawn from the holding tank, even when the meltor is melting additional gel. In the presently preferred embodiment, approximately one hour is required from the time that the initial solid gel has been placed into the meltor before the gel may be removed from the valve at a usable temperature. This is in sharp contrast to prior art devices where approximately 12 hours are required.

This, an apparatus for preparing duplicating material has been disclosed, having numerous advantages over the prior art. The apparatus may be fabricated utilizing known techniques and with readily available components.

I claim:

1. An apparatus for preparing duplicating materials and the like comprising:
    a meltor having lower end for receiving solid duplicating material, said member including at least one aperture disposed through said lower end;
    a first heating means coupled to said lower end of said meltor for heating duplicating material within said meltor;
    a holding vessel for containing melted duplicating material coupled to said meltor such that duplicating material in said meltor flows through said aperture into said holding vessel;
    a second heating means coupled to said holding vessel for heating material in said vessel;
    cooling means coupled to said vessel for cooling liquid in said vessel;
    pouring means which communicates with the interior of said vessel for removing liquid duplicating material from said vessel;
    whereby solid duplicating material may be placed in said meltor and melted by said first heating means and may be stored within said vessel with the temperature of the liquid in said vessel being controlled by said second heating means and said cooling means.

2. The apparatus defined in claim 1, including stirring means for stirring the liquid in said holding vessel.

3. The apparatus defined in claim 2 wherein said meltor is disposed above said vessel such that melted liquid in said meltor drops into said vessel through said aperture.

4. The device defined in claim 3 wherein said lower end of said meltor defines an interior conical surface having a plurality of apertures disposed about its circumference such that liquid melted within said meltor flows upon said surface through said apertures.

5. The apparatus defined by claim 1, including a grinder coupled to said meltor for grinding solid duplicating material before the material enters said meltor.

6. The device defined by claim 4 wherein said cooling means comprises an electrically operated blower, 7. The apparatus defined in claim 1, including a first thermostat coupled to said first heating means for controlling the temperature of material in said meltor.

8. An apparatus for preparing duplicating material or the like comprising:
    a housing;

a generally cylindrically shaped meltor having a lower end and including a plurality of apertures disposed adjacent said lower end;

a heating surface disposed in said lower end of said meltor;

a grinder for grinding solid material coupled to said meltor such that material placed in said grinder enters said meltor after being ground;

a holding tank disposed below said meltor such that melted material from said meltor drops into said tank;

heating means coupled to said tank for maintaining liquid in said tank at a predetermined temperature;

cooling means coupled to said tank for cooling liquid in said tank;

a stirrer mounted for movement within said tank for stirring liquid in said tank;

whereby solid duplicating material may be placed in said grinder and after being ground, is melted within said meltor, and flows through said apertures into said holding tank, where its temperature is controlled through said heating means and said cooling means to a predetermined temperature.

9. The device defined in claim 7 wherein said cooling means comprises an electrically operated blower.

10. The device defined in claim 8 wherein said heating surface disposed in the lower end of said meltor includes a general conically shaped surface with said apertures being disposed about the circumference of said surface such that melted liquid in said meltor flows from said surface through said apertures.

11. The device defined in claim 10 including liquid level sensing means for detecting the level of liquid in said holding tank.

12. The device defined in claim 11 wherein said liquid level means comprises a dipstick.

* * * * *